US010244055B2

(12) United States Patent
Shimazaki

(10) Patent No.: US 10,244,055 B2
(45) Date of Patent: Mar. 26, 2019

(54) COMMUNICATION APPARATUS THAT IS DIRECTLY CONNECTED WITH A TERMINAL APPARATUS WITHOUT AN INTERMEDIATION OF AN EXTERNAL APPARATUS, CONTROL METHOD FOR THE SAME, AND RECORDING MEDIUM

(71) Applicant: CANON KABUSHIKI KAISHA, Tokyo (JP)

(72) Inventor: Atsushi Shimazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/598,076

(22) Filed: May 17, 2017

(65) Prior Publication Data
US 2017/0339737 A1 Nov. 23, 2017

(30) Foreign Application Priority Data

May 20, 2016 (JP) ................................. 2016-101792

(51) Int. Cl.
*H04L 29/08* (2006.01)
*H04W 76/14* (2018.01)
*H04W 84/12* (2009.01)
*H04W 8/00* (2009.01)
*H04W 4/80* (2018.01)

(52) U.S. Cl.
CPC ........ *H04L 67/141* (2013.01); *H04L 67/1042* (2013.01); *H04W 76/14* (2018.02); *H04W 4/80* (2018.02); *H04W 8/005* (2013.01); *H04W 84/12* (2013.01)

(58) Field of Classification Search
CPC ............. H04L 67/1042; H04L 67/141; H04W 76/023; H04W 76/14
See application file for complete search history.

(56) References Cited

U.S. PATENT DOCUMENTS

| 2012/0265913 | A1 | 10/2012 | Suumaeki | |
|---|---|---|---|---|
| 2013/0148149 | A1* | 6/2013 | Park | G06F 3/1296 358/1.13 |
| 2014/0092425 | A1* | 4/2014 | Park | G06F 3/1292 358/1.15 |
| 2014/0240769 | A1 | 8/2014 | Tanji | |

(Continued)

FOREIGN PATENT DOCUMENTS

| CN | 103369454 A | 10/2013 |
|---|---|---|
| CN | 104010103 A | 8/2014 |

(Continued)

*Primary Examiner* — Chi H Pham
*Assistant Examiner* — Weibin Huang
(74) *Attorney, Agent, or Firm* — Canon U.S.A., Inc. IP Division

(57) ABSTRACT

Issues are addressed by providing a communication apparatus including a setting unit configured to execute a communication setting for operating the communication apparatus in a direct connection state without the intermediation of an external apparatus while specification processing is not executed for specifying whether or not the communication apparatus operates as an apparatus that determines a channel used for a direct connection with a terminal apparatus without the intermediation of the external apparatus in a case where a reception unit receives a setting command including a predetermined command.

14 Claims, 12 Drawing Sheets

(56) References Cited

U.S. PATENT DOCUMENTS

| | | | | |
|---|---|---|---|---|
| 2014/0320900 A1* | 10/2014 | Moriya | ............... | G06F 3/1206 |
| | | | | 358/1.15 |
| 2014/0320908 A1* | 10/2014 | Iwauchi | ............... | H04L 45/24 |
| | | | | 358/1.15 |
| 2014/0334340 A1* | 11/2014 | Goto | ................ | H04W 48/02 |
| | | | | 370/254 |
| 2015/0111493 A1 | 4/2015 | Berkema | | |
| 2015/0126115 A1* | 5/2015 | Yun | ................ | H04L 63/0492 |
| | | | | 455/41.1 |
| 2015/0230283 A1* | 8/2015 | Li | ...................... | H04W 76/14 |
| | | | | 455/41.1 |
| 2015/0304805 A1* | 10/2015 | Suzuki | ................ | H04W 76/10 |
| | | | | 455/41.1 |
| 2016/0323863 A1* | 11/2016 | Park | ..................... | H04W 4/70 |
| 2017/0285788 A1* | 10/2017 | Park | ..................... | H04L 67/06 |
| 2017/0339735 A1* | 11/2017 | Kawaguchi | ........... | H04W 76/38 |

FOREIGN PATENT DOCUMENTS

| | | |
|---|---|---|
| EP | 2645811 A2 | 10/2013 |
| JP | 2013-214804 A | 10/2013 |

* cited by examiner

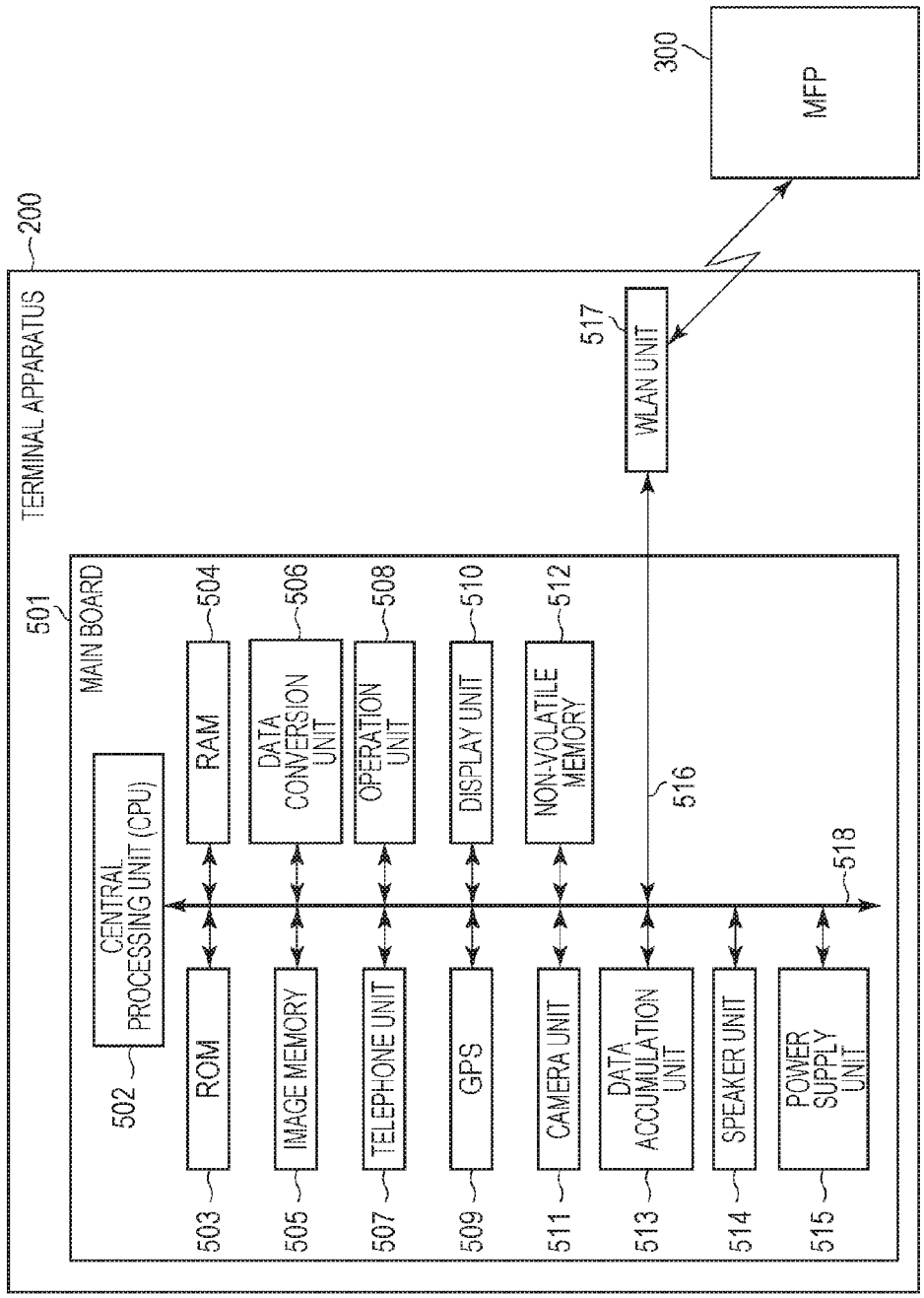

COMMUNICATION APPARATUS THAT IS DIRECTLY CONNECTED WITH A TERMINAL APPARATUS WITHOUT AN INTERMEDIATION OF AN EXTERNAL APPARATUS, CONTROL METHOD FOR THE SAME, AND RECORDING MEDIUM

BACKGROUND OF THE INVENTION

Field of the Invention

The present invention relates to a communication apparatus, a control method for the communication apparatus, and a recording medium.

Description of the Related Art

A communication apparatus configured to be directly connected with a terminal apparatus (establishing a peer-to-peer (P2P) connection) without the intermediation of an apparatus existing outside the terminal apparatus has been proposed.

Japanese Patent Laid-Open No. 2013-214804 describes a communication apparatus configured to easily establish a P2P connection with a terminal apparatus by accepting a setting command for setting a P2P operation mode from the terminal apparatus.

In a case where the P2P connection is established with the terminal apparatus, the communication apparatus executes specification processing for specifying whether or not the communication apparatus operates as an apparatus that determines a channel used for the P2P connection. However, the terminal apparatus does not execute the specification processing depending on a type of the terminal apparatus or a held function. For this reason, even when the terminal apparatus transmits a command for establishing the P2P connection with the communication apparatus to the communication apparatus, if the communication apparatus at a transmission destination of the command is a communication apparatus that requests the specification processing, the P2P connection with the communication apparatus is not established in some cases. On the other hand, the communication apparatus configured to execute the P2P connection without executing the specification processing does not establish the P2P connection involving the specification processing with the terminal apparatus that can execute the specification processing in some cases.

In these days, with spread of the communication apparatus that can easily establish the P2P connection with the terminal apparatus as described in Japanese Patent Laid-Open No. 2013-214804, a technology is demanded with which the P2P connection between the terminal apparatus and the communication apparatus can be easily established, and also both the P2P connection that involves the specification processing and the P2P connection that does not involve the specification processing can be executed.

In view of the above, the present invention provides a communication apparatus that can easily establish the P2P connection between the terminal apparatus and the communication apparatus, and also both the P2P connection that involves the specification processing and the P2P connection that does not involve the specification processing can be executed, a control method for the communication apparatus, and a program.

SUMMARY OF THE INVENTION

To address the above-described issues, a communication apparatus according to an aspect of the present invention relates to a communication apparatus that is directly connected with a terminal apparatus without the intermediation of an external apparatus that is an apparatus existing outside the terminal apparatus, the communication apparatus including a reception unit configured to receive a setting command for executing a communication setting of the communication apparatus from the terminal apparatus, an operation acceptance unit configured to accept a setting operation for executing the communication setting of the communication apparatus from a user via an operation unit included in the communication apparatus, and a setting unit configured to execute the communication setting of the communication apparatus, in which, in a case where the reception unit receives the setting command including a predetermined command for operating the communication apparatus in a direct connection state where the communication apparatus is directly connected with a terminal apparatus without an intermediation of the external apparatus, the setting unit executes a first communication setting for operating the communication apparatus in a first direct communication state where the communication apparatus is directly connected with a terminal apparatus without the intermediation of the external apparatus and the communication apparatus does not execute specification processing for specifying whether or not the communication apparatus operates as a specifying apparatus that determines a channel used for a direct connection with the terminal apparatus, and does not execute a second communication processing for operating the communication apparatus in a second direct connection state that the communication apparatus is directly connected with a terminal apparatus without the intermediation of the external apparatus and the communication apparatus executes the specification processing, and in a case where the operation acceptance unit accepts the setting operation for operating the communication apparatus in the direct connection state, the setting unit executes one of the communication settings including the first communication setting and the second communication setting.

Further features of the present invention will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 5 is a block diagram illustrating a configuration of the terminal apparatus.

DESCRIPTION OF THE EMBODIMENTS

Hereinafter, with reference to the drawings, exemplary embodiments of the present invention will be described for illustrative purposes. It should be noted however that relative arrangements, display screens, and the like described in the present exemplary embodiment are not intended to limit the scope of this invention to those unless particularly specified.

First Exemplary Embodiment

A terminal apparatus and a communication apparatus according to the present exemplary embodiment will be described. A smart phone is exemplified as the terminal apparatus according to the present exemplary embodiment. The smart phone refers to a multi-functional mobile phone provided with camera, web browser, and electronic mail functions and the like in addition to a mobile phone function. It should be noted that the terminal apparatus to which the exemplary embodiment of the present invention can be applied is not limited to the smart phone, and any apparatus that can communicate with a communication apparatus which will he described below may be used. For example, a digital camera, a mobile terminal, a laptop personal computer (PC), a tablet terminal, a personal digital assistant (PDA), a music playing device, and the like can be used as the terminal apparatus. In addition, according to the present exemplary embodiment, a multi function peripheral provided with a copying function, a facsimile (FAX) function, and a printing function (hereinafter, which will be referred to as an MFP) is exemplified as the communication apparatus but the configuration is not limited to this. Various apparatuses can be used as long as the apparatus can perform a communication with the terminal apparatus. For example, an ink-jet printer, a full-color laser beam printer, a monochrome printer, and the like can be used as a printer. In addition, the configuration is not limited to the printer, and a copier, a facsimile apparatus, a smart phone, a mobile terminal, a laptop PC, a tablet terminal, a PDA, a digital camera, a music playing device, a storage, and the like can also be used. In addition to the above, a single function printer provided with a sole function (hereinafter, which will be referred to as an SFP) can also be used.

System Configuration

First, a system configuration for realizing the present exemplary embodiment will be described with reference to FIGS. 1 to 6.

Figure 1:
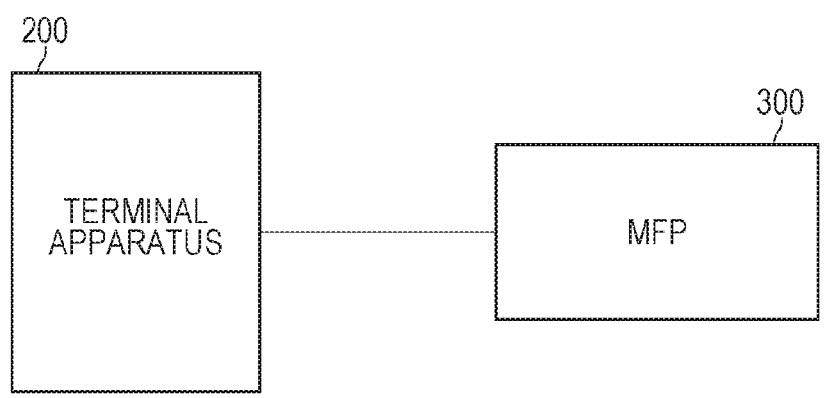
FIG. 1 illustrates an example of a configuration or a communication system.

FIG. 1 illustrates an example of a configuration of a communication system according to the present exemplary embodiment. This system includes an access point 400, a terminal apparatus 200, and an MFP 300.

The terminal apparatus 200 is a terminal apparatus according to the present exemplary embodiment. The MFP 300 is a communication apparatus according to the present exemplary embodiment. The terminal apparatus 200 and the MFP 300 can establish a wireless local area network (WLAN) via the access point 400 provided outside the respective apparatuses and communicate with each other. In addition, with regard to the MFP 300 and the terminal apparatus 200, each of the apparatuses itself can also operate as the access point. For this reason, for example, when one of the apparatuses functions as the access point, and the other apparatus is connected with this access point, the terminal apparatus 200 and the MFP 300 can establish a direct wireless LAN connection without the intermediation of the access point 400. In addition, since both the terminal apparatus 200 and the MFP 300 have a WLAN function, it is possible to perform a peer-to-peer (hereinafter, which will be referred to as P2P) communication when authentication processing is executed. It should be noted that, in a case where each of the apparatuses functions as the access point, the apparatus constructs a wireless LAN with a communication partner apparatus and periodically transmits a beacon signal. Furthermore, in a case where each of the apparatuses functions as the access point, the apparatus determines a channel used for the wireless communication and performs authentication processing for connection information (such as a password) transmitted from the communication partner apparatus.

A wireless communication system constituted by an access point and a client will be described. First, an apparatus functioning as the access point transmits the beacon signal. When the client receives the beacon signal, the client transmits a device search command (probe request frame) to the access point to search for and discover an apparatus corresponding to a communication partner (connection partner apparatus). The apparatus to be searched for (client) can attach various attributes (parameters) such as an SSID of the access point to the device search command. In particular, in the case of a P2P wireless connection, the device search command includes information (P2P element) related to the P2P wireless connection. In a case where an SSID included in the received device search command is matched with its own SSID, the access point transmits a response command (probe response frame) to the client. As a result, each of the apparatuses can mutually discover the apparatus on the partner side (apparatus search (discovery)). Then, a sequence for checking device information indicating a type of the apparatus or an IP address or the like is executed between the respective apparatuses, and thereafter, it is possible to execute various applications such as printing.

Figure 2:
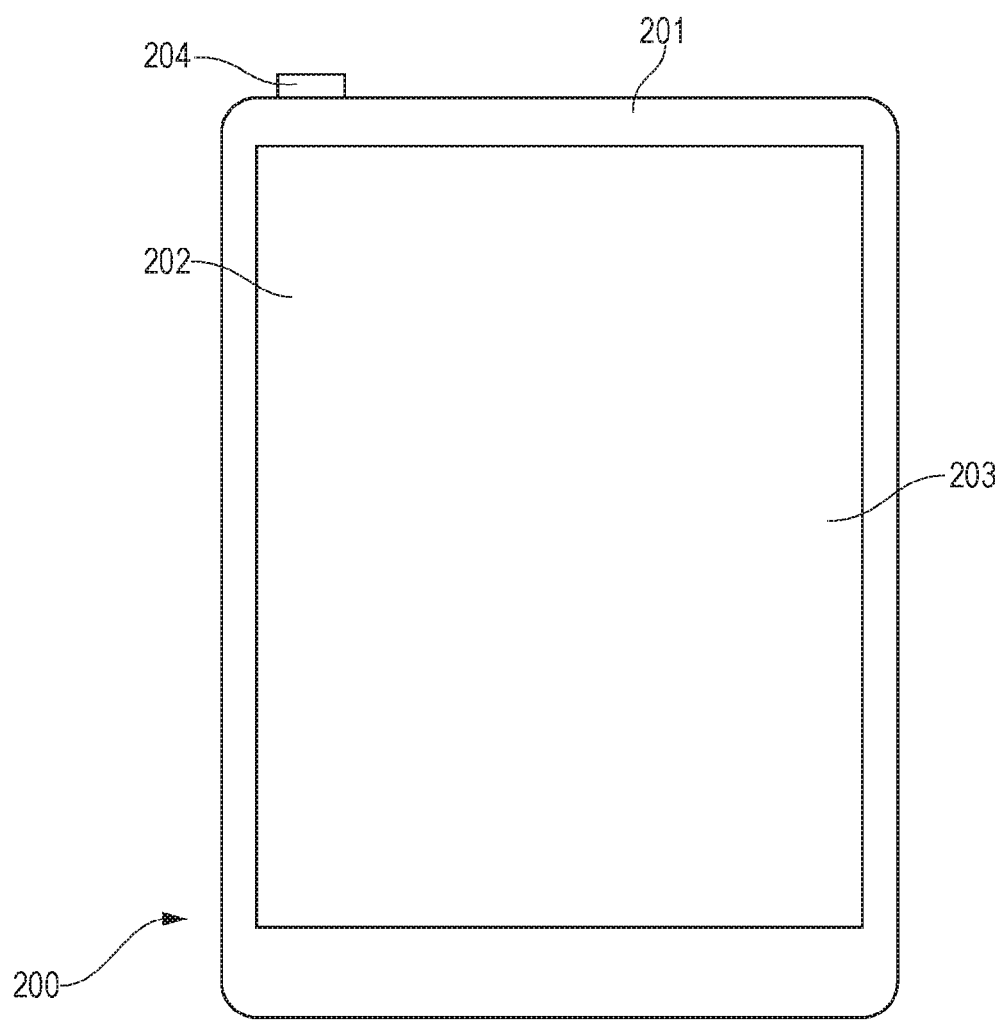
FIG. 2 illustrates an example of an external appearance of a terminal apparatus.

FIG. 2 illustrates an external appearance of the terminal apparatus 200.

A WLAN unit 201 is a unit configured to perform a wireless communication by way of WLAN. The WLAN unit 201 can perform a data (packet) communication in a WLAN system in conformity to IEEE802.11 series, for example. That is, the WLAN unit 201 can execute a communication by way of Wi-Fi®, for example. The WLAN unit 201 realizes functions such as beacon detection processing, authentication processing, transmission of a print job to the communication apparatus that has established the WLAN connection, and the like. In addition, the WLAN unit 201 can perform a communication in a Wi-Fi Direct (WFD) mode, a software AP mode, an ad-hoc mode, an infrastructure mode, and the like. The communication in the WFD mode, the communication in the software AP mode, and the communication in the ad-hoc mode refer to a direct communication with the connection partner apparatus (the MFP 300 or the like) (without the intermediation of an external apparatus). In addition, the communication in the infrastructure mode refers to a communication with the connection partner apparatus via an external apparatus (the access point 400 or the like) provided on a network.

A display unit 202 is a display provided with a display mechanism of an LCD method, for example. Specifically, the display unit 202 displays a button icon or a software keyboard.

An operation unit 203 is provided with an operation mechanism of a touch panel method and detects an operation a user. Specifically, the operation unit 203 detects an operation event generated when the user touches the button icon or the software keyboard displayed by the display unit 202.

A power key 204 is a hard key used when a power supply is turned on and off.

Figure 3:
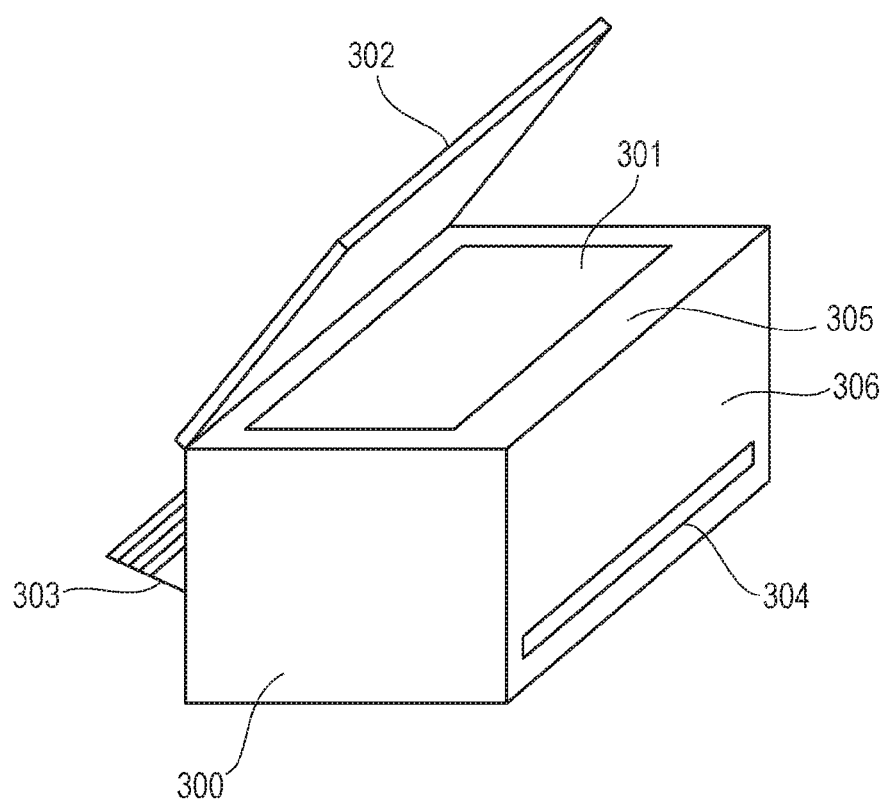
FIG. 3 illustrates an example of an external appearance of an MFP.

FIG. 3 illustrates an external appearance of the MFP 300. A platen glass 301 is a transparent platen made of glass on which a document is placed to be read by a scanner (reading unit). A document lid 302 is a lid for pressing the document when reading is performed by the scanner or avoiding leakage to the outside of reading light with which the document is irradiated when the reading performed.

A print sheet insertion slot 303 is an insertion slot in which sheets of various sizes can be set. The sheets set in the print sheet insertion slot 303 are conveyed one by one to a printing unit which is not illustrated in the drawing and discharged from a print sheet discharge slot 304 after printing is performed by the printing unit.

An operation display unit 305 is constituted by keys such as a character input key, a cursor key, a determination key, and a cancel key, a light emitting diode (LED), a liquid crystal display (LCD), and the like and can accept activations of various functions as the MFP and various settings from the user. It should be noted that the operation display unit 305 may be constituted a touch panel.

A WLAN antenna 306 is an antenna for performing a communication by way of WLAN.

Figure 4A:
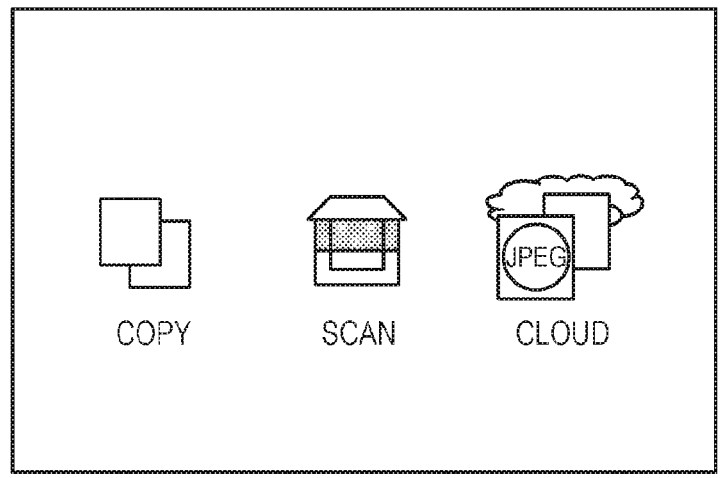
FIGS. 4A to 4C illustrate examples of a screen displayed on an operation display unit of the MFP.
Figure 4B:
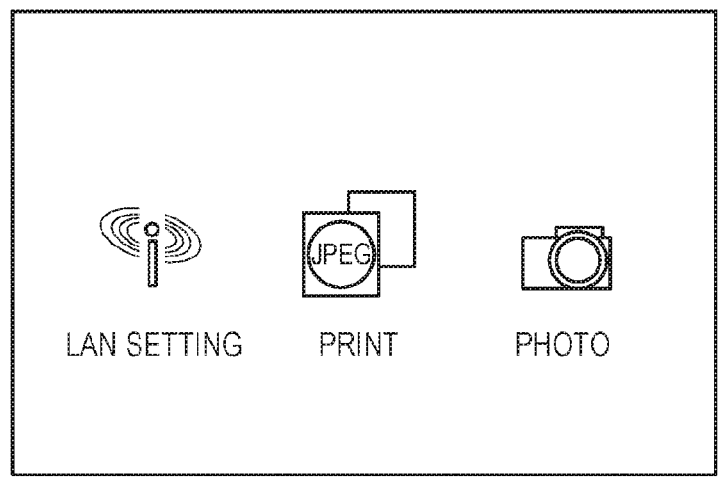
Figure 4C:
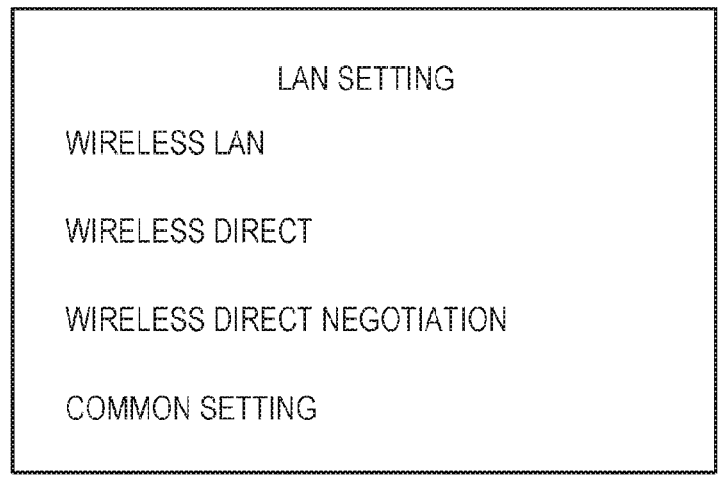

FIGS. 4A to 4C illustrate examples of a screen displayed on the operation display unit 305. FIG. 4A illustrates a screen displayed on the operation display unit 305 in a state in which the MFP 300 does not perform an operation such as printing or scanning (idle state). The MFP 300 can execute copying, scanning, menu display of cloud function using an internet communication, and various settings and functions in a state in which the screen of FIG. 4A is displayed on the operation display unit 305. When the above-described operation is accepted, the operation display unit 305 can seamlessly display a screen different from that of FIG. 4A. FIG. 4B illustrates an example thereof. When the key operation or the touch panel operation by the user is accepted in a state in which the screen illustrated in FIG. 4B is displayed on the operation display unit 305, the MFP 300 can execute a printing or photographing function or change of a LAN setting. FIG. 4C illustrates a screen displayed when the user performs the operation for executing the LAN setting in a state in which the screen of FIG. 4B is displayed on the operation display unit 305. In a case where "wireless LAN" on the screen illustrated in FIG. 4C is selected by the user operation, the MFP 300 accepts a validation/invalidation setting of the infrastructure mode from the user. On the other hand, in a case where "wireless direct" on the screen illustrated in FIG. 4C is selected by the user operation, the MFP 300 accepts a validation/invalidation setting of the WFD function from the user. In addition, in a case where "wireless direct negotiation" on the screen illustrated in FIG. 4C is selected by the user operation, the MFP 300 accepts a presence/absence setting of a negotiation setting which will be described below from the user.

FIG. 5 is a block diagram illustrating a configuration of the terminal apparatus 200.

The terminal apparatus 200 includes a main board 501 configured to perform main control of the apparatus itself and a WLAN unit 517 configured to perform a WLAN communication.

A central processing unit (CPU) 502 functions as a system control unit and controls the entirety of the terminal apparatus 200 by execution of a program stored in a ROM 503 or activation of hardware on the main board 501. It should be noted that processing executed by the terminal apparatus 200 which will be described below is executed under the control of the CPU 502.

The ROM 503 stores control programs executed by the CPU 502, a built-in operating system (OS) program, and the like. According to the present exemplary embodiment, the control programs stored in the ROM 503 perform software control such as scheduling and task switching under the management of the built-in OS stored in the ROM 503.

A RAM 504 is a memory constituted by a static random access memory (SRAM), a dynamic random access memory (DRAM), or the like. The RAM 504 stores data such as program control variables and data such as setting values registered by the user and management data of the terminal apparatus 200. It should be noted that various work buffer areas are provided in the RAM 504.

An image memory 505 is constituted by a memory such as a DRAM and temporarily stores image data received via the WLAN unit 517 and image data read out from a data accumulation unit 513 to be processed by the CPU 502.

A non-volatile memory 512 is constituted by a memory such as a flash memory and stores data that should be held even when the power supply is turned off.

It should be noted that a memory configuration held by the terminal apparatus 200 is not limited to this mode, and the number of memories, characteristics, storage capacities, and the like may be appropriately changed in accordance with the use and purpose. For example, the image memory 505 and the RAM 504 may be commonly used, or data backup or the like may be performed in the data accumulation unit 513. In addition, according to the present exemplary embodiment, the DRAM is used as the image memory 505, but another storage medium such as a hard disc drive (HDD) or a non-volatile memory may also be used, for example.

A data conversion unit 506 performs analysis of data in various formats, color conversion with respect to the image data, and data conversion such as image conversion.

A telephone unit 507 performs telephone line control and realizes a communication by way of telephone by processing audio data input and output via a speaker unit 514.

An operation unit 508 controls a signal output from the operation unit 203 and detects an operation by the user.

A global positioning system (GPS) 509 obtains position information of current latitude and longitude of the terminal apparatus 200.

A display unit 510 electronically controls contents of the screen displayed on the display unit 202 and can perform display of various input operation screens, operation situation screen of the MFP 300, status situation screen, and the like on the display unit 202.

A camera unit 511 has a function of electronically recording an image input via a lens to be coded. Image data corresponding to the image shot by the camera unit 511 is saved in the data accumulation unit 513.

The speaker unit 514 realizes a function of inputting or outputting audio for the telephone function and also a function of alarm notification and the like.

A power supply unit 515 is a portable battery and controls power supply into the terminal apparatus 200. Power supply states of the terminal apparatus 200 include a battery exhaustion state in which the battery has no remaining power, a power off state in which the power key 204 is not pressed, an activation state in which the terminal apparatus 200 is normally activated, and a power saving state in which the terminal apparatus 200 is activated but power consumption is lower than that of the activation state.

The WLAN unit 517 is a unit configured to perform a wireless communication by way of WLAN and corresponds to the WLAN unit 201 described above. It is assumed that the WLAN unit 517 can perform a data (packet) communication in the WLAN system in conformity to the IEEE802.11 series, for example. That is, the WLAN unit 517 can execute a communication by way of Wi-Fi®, for example. The WLAN unit 517 performs functions including beacon detection processing and authentication processing to establish a WLAN connection, transmission of a printing job to a communication apparatus where the WLAN connection is established, and the like. The terminal apparatus 200 performs a data communication with another device such as the MFP 300 by the WLAN unit 517. The WLAN unit 517 converts the data into packets and performs packet transmission to the other device, or inversely, restores the packets from the other external device to the original data to be transmitted to the CPU 502. It should be noted that the WLAN unit 517 is connected with the main board 501 via a bus cable 516.

The various components (503 to 515 and 517) in the main board 501 are connected with one another via a system bus 519 managed by the CPU 502.

Figure 6:
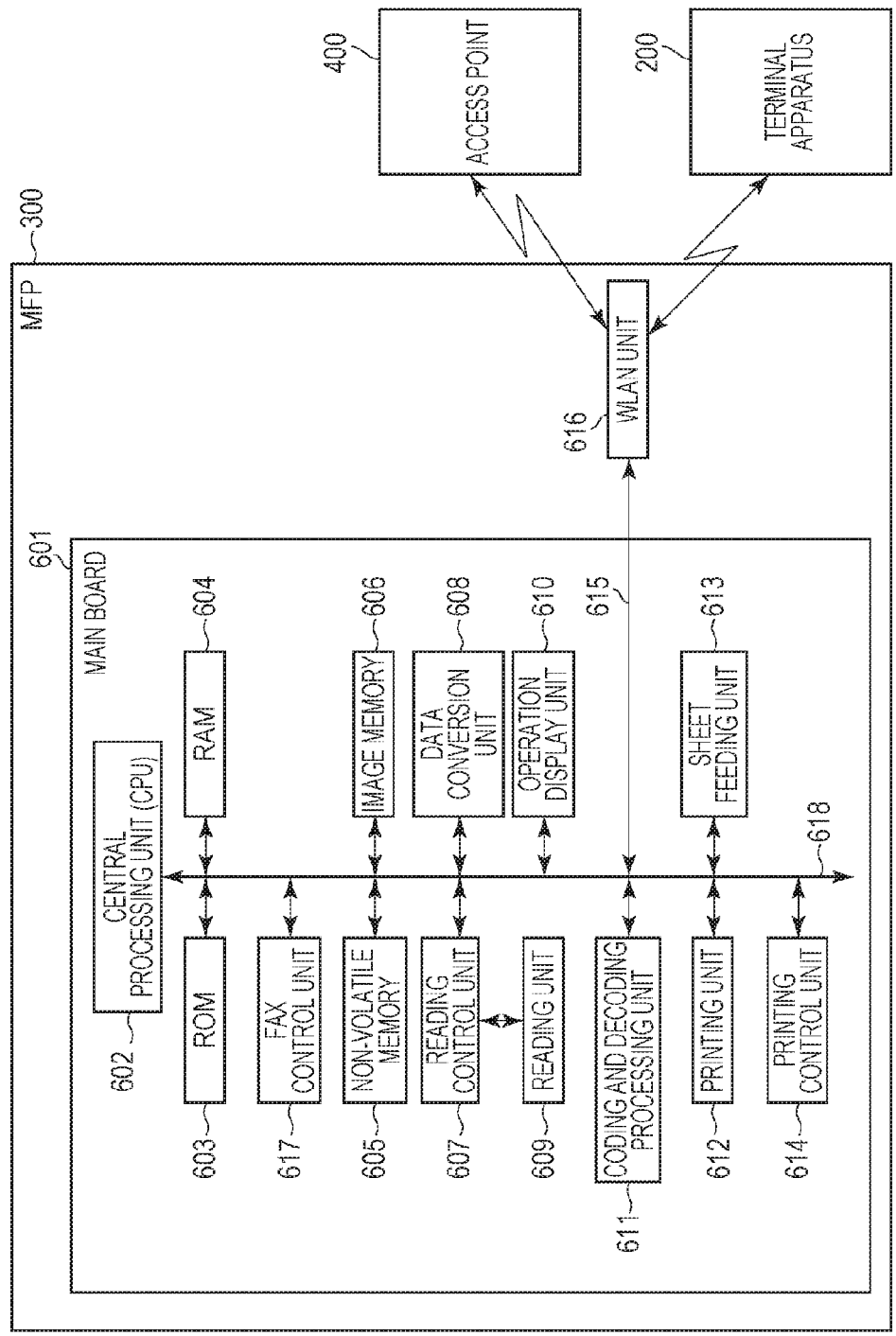
FIG. 6 is a block diagram illustrating a configuration of the MFP.

FIG. 6 is a block diagram illustrating a configuration of the MFP 300.

The MFP 300 includes a main board 601 configured to perform main control of the apparatus itself and a WLAN unit 616 configured to perform a WLAN communication.

A CPU 602 functions as a system control unit and controls the entirety of the MFP 300 by execution of a program stored in a ROM 603 or activation of hardware on the main board 601. It should be noted that processing executed by the MFP 300 which will be described below is executed under the control by the CPU 602.

The ROM 603 stores control programs executed by the CPU 602, a built-in OS program, and the like. According to the present exemplary embodiment, the respective control programs stored in the ROM 603 perform software control such as scheduling and task switching under the management of the built-in OS stored in the ROM 603.

A RAM 604 is a memory constituted by an SRAM, a DRAM, or the like. The RAM 604 stores data including data of program control variables and the like, setting values registered by the user, and data of management data of the MFP 300 and the like. It should be noted that various work buffer areas are provided in the RAM 604.

A non-volatile memory 605 is constituted by a memory such as a flash memory and stores data that should be held even when the power supply is turned off.

An image memory 606 is constituted by a memory such as a DRAM and accumulates image data received via the WLAN unit, image data processed by a coding and decoding processing unit 611, and the like.

In addition, similarly as in the memory configuration held by the terminal apparatus 200, the memory configuration held by the MFP 300 is not limited to this mode, and the number of memories, characteristics, storage capacities, and the like may be appropriately changed in accordance with the use and purpose.

A data conversion unit 608 performs analysis of data in various formats, conversion from image data to print data, and the like.

A reading control unit 607 controls a reading unit 609 (for example, a contact image sensor (CIS)) to optically read an image on the document. Then, the reading control unit 607 outputs an image signal obtained by converting the read image into electric image data. At this time, the reading control unit 607 may apply various image processings such as binarization processing and half tone processing to the image signal and then output the image signal.

An operation display unit 610 plays a role as an operation acceptance unit that corresponds to the operation display unit 305 and accepts operations for activations of various functions as the MFP and various settings from the user.

The coding and decoding processing unit 611 performs coding and decoding processing or enlargement and reduction processing with respect to the image data (JPEG, PNG, or the like) dealt with by the MFP 300.

A sheet feeding unit 613 holds recoding media for printing. It should be noted that a plurality of sheet feeding units 613 may be prepared to hold plural types of recording media in a single apparatus.

A printing control unit 614 controls the sheet feeding unit 613 and can supply the recording media to a printing unit 612. It should be noted that, in a case where the plurality of sheet feeding units 613 are prepared, the printing control unit 614 can control from which sheet feeding unit the sheet feeding is performed among the plurality of sheet feeding units 613.

The printing control unit 614 applies various image processings such as smoothing processing, print density correction processing, and color correction to the image data to be printed and then outputs the image data to the printing unit 612.

The printing unit 612 is an ink-jet printer configured to eject ink supplied from an ink tank from a print head to print an image. It should be noted that the printing unit 612 may be a printer other than the ink-jet printer. For example, a laser beam printer or the like may also be used. The printing control unit 614 periodically reads out information of the printing unit 612 to update the information of the RAM 604. Specifically, the printing control unit 614 updates status information such as the remaining amount of the ink tank and a state of the print head. Since the WLAN unit 616 corresponds to the WLAN unit 201, descriptions thereof will be omitted. The WLAN unit 616 is connected with the main board 601 via a bus cable 615. It should be noted that the terminal apparatus 200 and the MFP 300 can perform a communication based on Wi-Fi Direct (WFD) by the WLAN units provided in the respective apparatuses and have a software access point (software AP) function. The software AP function refers to a function for causing the apparatus that executes this function to operate as the software-based access point.

Since the WLAN unit 616 has a function similar to that of the WLAN unit included in the terminal apparatus 200, descriptions thereof will be omitted. It should be noted that, in a case where the WLAN unit 616 performs the communication in the WFD mode, the communication in the software AP mode, or the communication in the ad-hoc mode, the WLAN unit 616 directly communicates with the connection partner apparatus such as the terminal apparatus 200 (without the intermediation of the external apparatus).

In a case where the WLAN unit 616 performs the communication in the infrastructure mode, the WLAN unit 616 communicates with the connection partner apparatus via the external apparatus (the access point 400 or the like) installed on the network.

The various components (602 to 614, 616, and 617) in the main board 601 are connected with one another via a system bus 618 managed by the CPU 602.

Regarding Peer-to-Peer (P2P) Mode

To establish a connection of the P2P method in the communication in the WLAN, the MFP 300 according to the present exemplary embodiment operates in the P2P mode (the software AP mode or the Wi-Fi Direct (WFD) mode). It should be noted that, according to the present exemplary embodiment, the connection based on the P2P method refers to a mode in which the apparatuses are directly wirelessly connected with each other without the intermediation of the external apparatus.

It should be noted that WFD is the standard established by Wi-Fi Alliance. The terminal apparatus 200 and the MFP 300 functioning as WFD compatible devices have the software access point (software AP) function for operating as the access point. For this reason, the terminal apparatus 200 and the MFP 300 can be directly wirelessly connected with each other by way of WFD without the intermediation of the other access point. It should be noted that which one of the WFD compatible devices that communicate by way of WFD operates as the software AP is determined in accordance with a sequence called a group owner negotiation (hereinafter, which will be referred to as a negotiation). Specifically, which one of the apparatuses operates as the software AP is determined by the respective apparatuses on the basis of the magnitude of intent values previously set in the respective apparatuses. Hereinafter, the apparatus that plays the role of the software AP is particularly referred to as a group owner. It should be noted that, according to the present exemplary embodiment, Channels 1 to 13 in a frequency band of 2.4 GHz stipulated by the Wi-Fi standard specifications are used for the communication between the apparatuses. The group owner plays a role for determining the channel used for the communication between the apparatuses. For this reason, the negotiation can be also referred to as processing for specifying whether or not the apparatus operates as an apparatus that determines the channel used for the communication between the apparatuses. It should be noted that the channel used by the MFP 300 is not limited to Channels 1 to 13. For example, in a case where communications can be performed by using a frequency band of 2.4 GHz and a frequency band of 5 GHz, the MFP 300 can use Channels 1 to 13 and Channels 36 to 140.

It should be noted that, according to the present exemplary embodiment, the user can execute a setting whether or not the MFP 300 performs the negotiation (hereinafter, which will be referred to as a negotiation setting) by an operation on an operation display unit 610, transmission of a setting command from the terminal apparatus, or the like. In a case where the setting that the negotiation is not performed is set (in a case where the negotiation setting is "absent"), the MFP 300 does not execute the negotiation, and the MFP 300 itself certainly operates as the group owner. For this reason, in a case where the negotiation setting is "absent", the MFP 300 can also establish the connection based on the P2P method by way of Wi-Fi with an apparatus that is not compatible with the WFD function and does not execute the negotiation. On the other hand, in a case where the setting that the negotiation is performed is set (in a case where the negotiation setting is "present"), the MFP 300 executes the negotiation and determines the group owner upon the connection based on WFD.

It should be noted that, in a communication system constituted by apparatuses that communicate in respective modes, the apparatus on the searching side uses the device search command (for example, the probe request frame) to search for and discover the apparatus corresponding to the communication partner (connection partner apparatus). The apparatus to be searched for can attach various attributes (parameters) to the device search command. In particular, at the time of the search for the connection based on the P2P method, the device search command includes information (P2P element) related to the P2P wireless connection. In a case where an attribute is specified in the search command, it is normally recommended that the apparatus responding to the device search command responds to the interpretable attribute to a maximum extent within a range stipulated by a specification of the mode of the apparatus on the searching side and the prerequisite specification (Wi-Fi in the case of WFD). Even in a case where the apparatus responding to the device search command does not interpret the information attached to the device search command (including the above-described attribute), the apparatus can also respond on the basis of only the information that can be interpreted.

Hereinafter, wireless connection sequences in the respective modes will be described with reference to FIG. 7 and FIG. 8.

Figure 7:
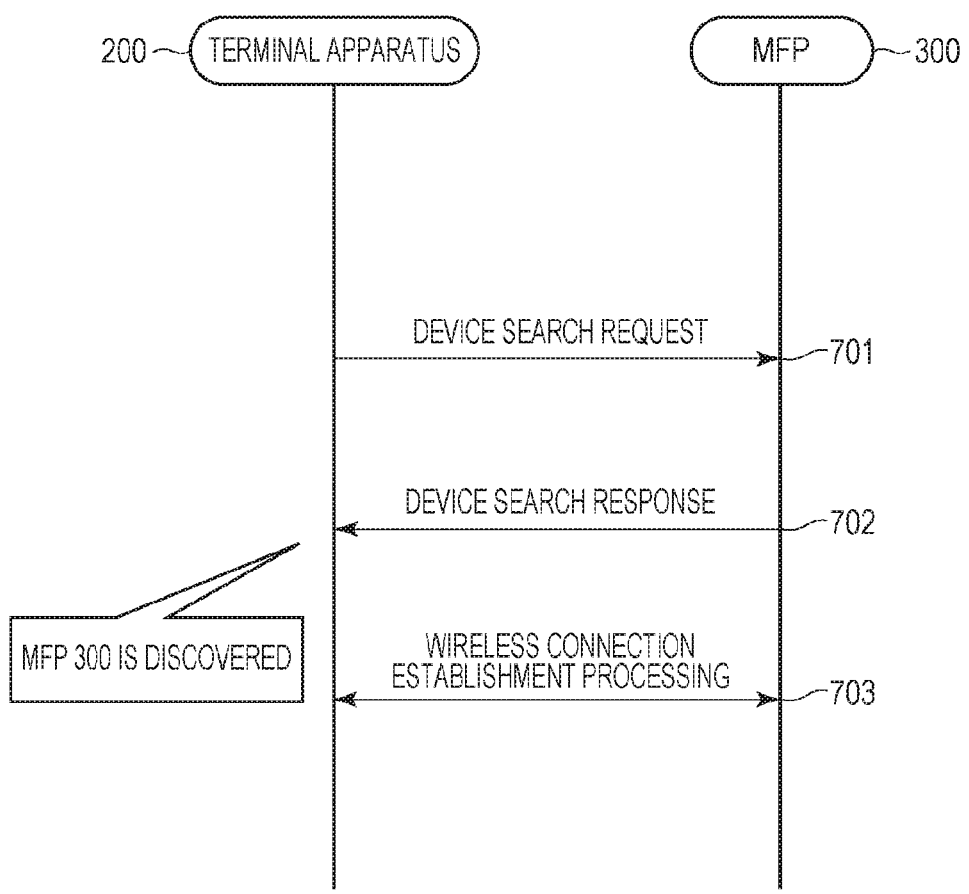
FIG. 7 illustrates a wireless connection sequence in a software AP mode.

FIG. 7 illustrates a wireless connection sequence in the software AP mode. It should be noted that the processings executed by the respective apparatuses in the present sequence are realized when the CPUs included in the respective apparatuses read out the various programs stored in the memories such as the ROMs included in the respective apparatuses to the RAMs included in the respective apparatuses to be executed. In addition, the present sequence is started in a state in which the terminal apparatus 200 operates as the client, the MFP 300 operates as the software AP, and the MFP 300 transmits the beacon signal. It should be noted that the MFP 300 starts the operation as the software AP in a case where the MFP 300 accepts a predetermined operation for operating as the software AP from the user. In addition, the predetermined operation refers to an operation for selecting a predetermined icon for starting the operation as the software AP on a LAN setting screen, for example.

First, in S701, the terminal apparatus 200 sequentially uses channels that can be used by the terminal apparatus 200 to transmit the device search command and searches for an apparatus that operates as the software AP.

Next, in S702, in a case where the device search command transmitted from the terminal apparatus 200 is received, the MFP 300 transmits a device search response corresponding to a response with respect to the device search command to the terminal apparatus 200. It should be noted that the MFP 300 does not transmit the device search response with respect to the device search command transmitted by using a channel other than the channel used by itself. For example, when a channel that can be used by the MFP 300 is Channel 4, the MFP 300 does not transmit a response command to a device search request command transmitted by using Channel 1. For this reason, in a case where the response from the MFP 300 is not present for a predetermined period of time or longer after the device search command is transmitted by using Channel 1, the terminal apparatus 200 transmits the device search request command by using Channel 2. The terminal apparatus 200 repeats the above-described attempt by incrementing the number of the used channel. When the device search command transmitted by the terminal apparatus 200 by using Channel 4 is received, for example, the MFP 300 transmits the device search response to the terminal apparatus 200. As a result, the terminal apparatus 200 discovers the MFP 300. It should be noted that the channel used for the transmission of the device search response is determined as the channel used for the communication between the terminal apparatus 200 and the MFP 300 hereinafter. That is, the channel used for the communication between the terminal apparatus 200 and the MFP 300 is determined by the MFP 300 operating as the software AP.

Next, in S703, establishment processing for a wireless connection in related art is executed between the terminal apparatus 200 and the MFP 300. Specifically, processings such as transmission of a connection request, authentication of the connection request, and allocation of an IP address are performed. It should be noted that, with regard to commands and parameters transmitted and received in the establishment processing for the wireless connection between the terminal apparatus 200 and the MFP 300, commands and parameters stipulated by the Wi-Fi standard may be used, and descriptions thereof will be omitted here.

Figure 8:
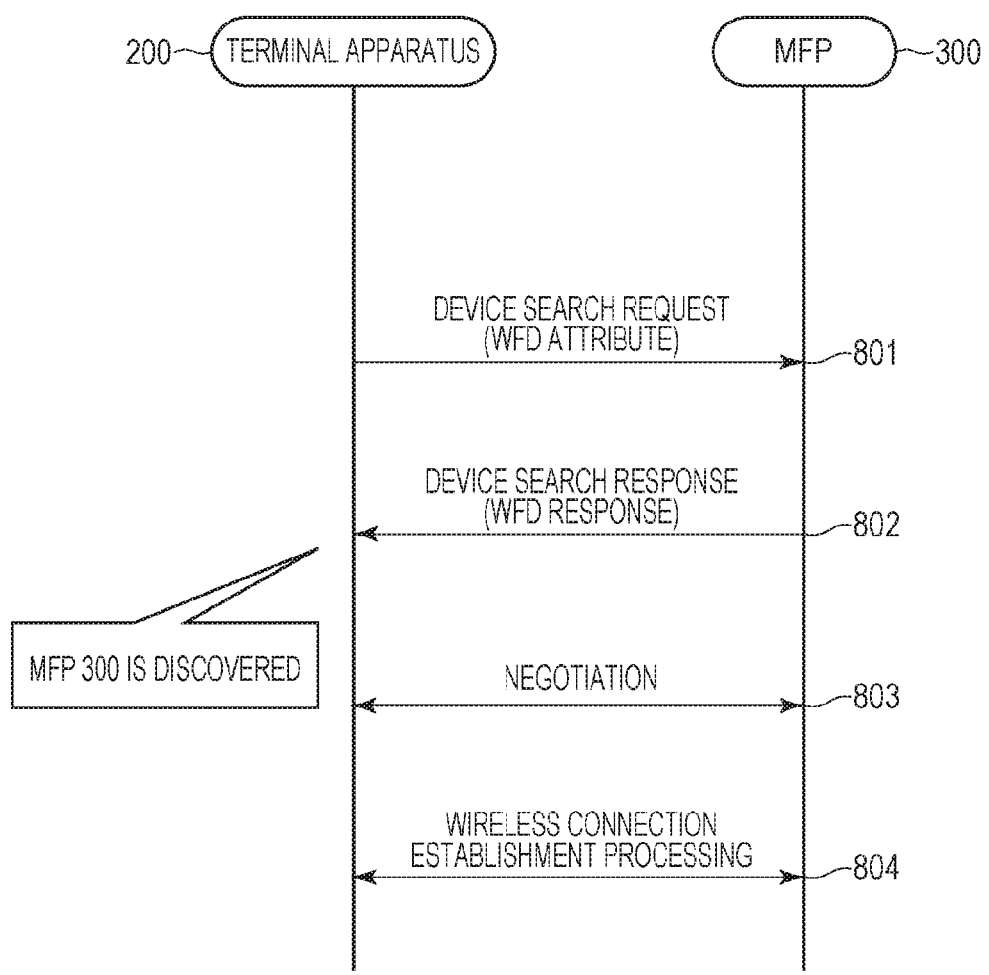
FIG. 8 illustrates the wireless connection sequence in a WFD mode.

FIG. 8 illustrates a wireless connection sequence in the WFD mode. It should be noted that the processings executed by the respective apparatuses in the present sequence are realized when the CPUs included in the respective apparatuses read out the various programs stored in the memories such as the ROMs included in the respective apparatuses to the RAMs included in the respective apparatuses to be executed. In addition, the present processing is started in a case where the predetermined operation for establishing the connection based on WFD is accepted from the user in a state in which the respective apparatuses activate the predetermined application for executing the WFD function.

First, in S801, the terminal apparatus 200 transmits the device search command to search for the apparatus compatible with the WFD function as the communication partner apparatus.

Next, in S802, the MFP 300 transmits the device search response corresponding to the response with respect to the received device search command to the terminal apparatus 200. As a result, the terminal apparatus 200 discovers the MFP 300 as the apparatus compatible with the WFD function. It should be noted that, after the terminal apparatus 200 discovers the MFP 300, processing for exchanging information related to services and functions that can be supplied by the respective apparatuses may be performed between the respective apparatuses.

Next, in S803, negotiation processing (specification processing) is performed between the terminal apparatus 200 and the MFP 300. The negotiation processing refers to processing for specifying the roles in the communication based on the P2P method (the group owner and the client) by using predetermined setting values held by the respective apparatuses. It should be noted that, in a case where the roles of the respective apparatuses are specified by the negotiation processing, parameters for performing the communication by way of Wi-Fi Direct are exchanged between the respective apparatuses (parameter exchange phase). The parameter exchange phase corresponds, for example, to automatic exchange of parameters for wireless LAN security by Wi-Fi Protected Setup. It should be noted that, after the negotiation is performed, the group owner determines the channel used for the subsequent communication.

Thereafter, in S804, the respective apparatuses execute the wireless connection establishment processing on the basis of the exchanged parameters.

It should be noted that, as described above, the MFP 300 can accept the negotiation setting according to the present exemplary embodiment. Here, descriptions will be given of the wireless connection sequence in a case where the setting that the negotiation is not performed is set and also the terminal apparatus 200 is not compatible with the WFD function. As described above, in a case where the setting that the negotiation is not performed is set, the MFP 300 proceeds the processing while it is assumed that the MFP 300 itself operates as the group owner. In addition, the terminal apparatus 200 that is not compatible with the WFD function issues a regular device search command (that is not based on the WFD standard) to search for the MFP 300 corresponding to the communication partner.

Since the terminal apparatus 200 is not compatible to the WFD function and the setting that the negotiation is not performed is set in the MFP 300, the respective apparatuses do not perform processing for exchanging information related to services that can be supplied and functions, the negotiation, or the parameter exchange. At this time, since the MFP 300 and the terminal apparatus 200 do not perform the parameter exchange, if the process directly enters a phase of the wireless connection establishment processing, the connection is not, established.

In view of the above, according to the present exemplary embodiment, in a case where the WFD function of the MFP 300 is validated by the operation on the operation display unit 305, a mode is adopted in which the user previously inputs parameters used for the wireless connection displayed on a screen display unit of the operation display unit 305 to the terminal apparatus 200. On the other hand, in a case where the WFD function of the MFP 300 is validated by the cable-less setup, the parameters used for the wireless connection are transmitted to the terminal apparatus 200 via the connection between the MFP 300 and the terminal apparatus 200 at the time of the cable-less setup. When the above-described mode is adopted, even when the process proceeds to the phase of the wireless connection establishment processing without the parameter exchange, the connection between the apparatuses is successfully established.

As described above, when the setting that the negotiation is not performed is set in the MFP 300, even the terminal apparatus that is not compatible to the WFD function can establish the connection with the MFP 300.

Regarding Infrastructure Mode

As described above, the infrastructure mode refers to the mode in which the apparatuses that perform the communication (for example, the terminal apparatus 200 and the MFP 300) communicate with each other via the external apparatus that controls the network in an overall manner (for example, the access point 400).

Figure 12:
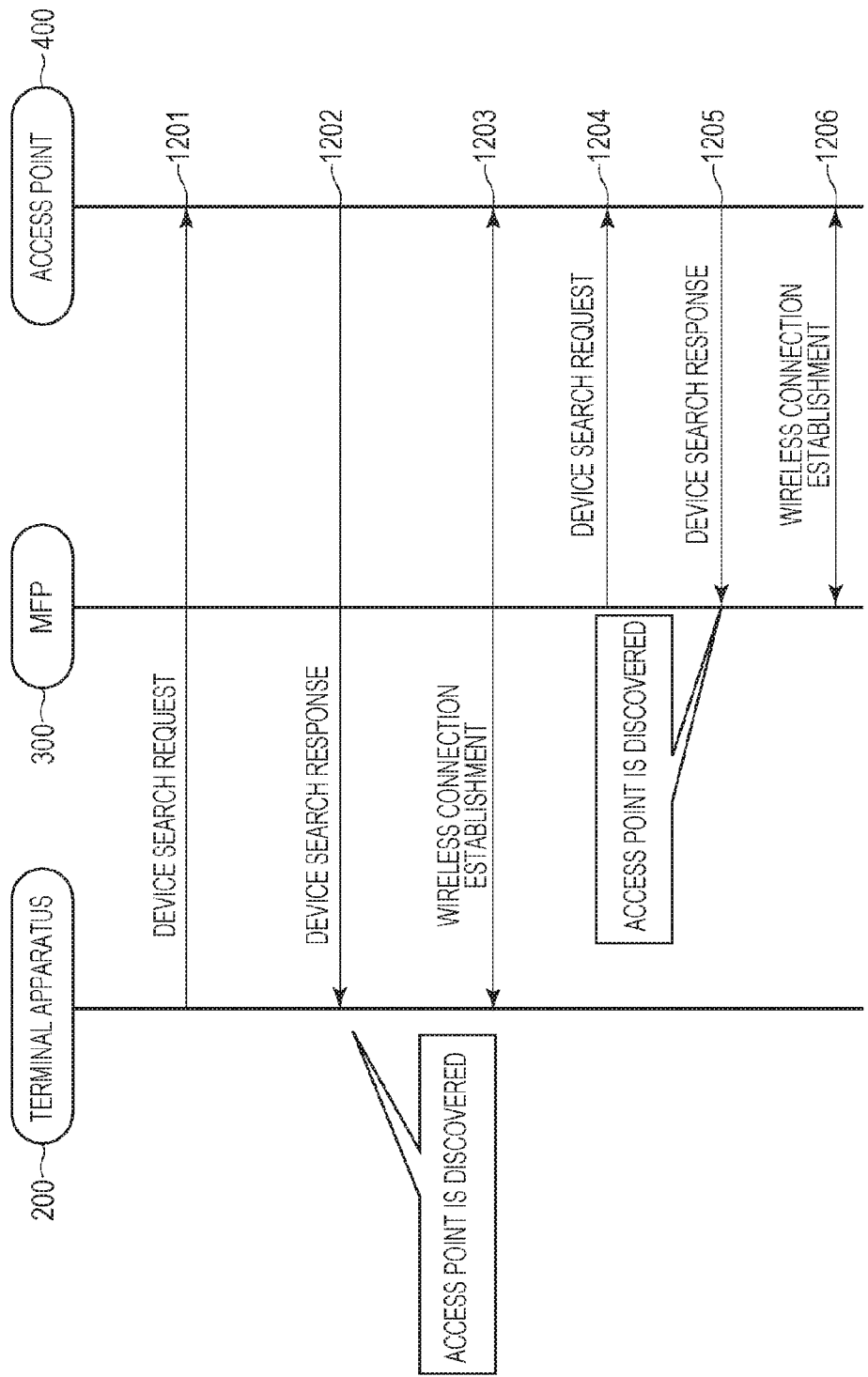
FIG. 12 illustrates the wireless connection sequence in an infrastructure mode.

FIG. 12 illustrates a wireless connection sequence in the infrastructure mode. It should be noted that the processings executed by the respective apparatuses in the present sequence are realized when the CPUs included in the respective apparatuses read out the various programs stored in the memories such as the ROMs included in the respective apparatuses to the RAMs included in the respective apparatuses to be executed.

First, in S1201, the terminal apparatus 200 sequentially uses channels that can be utilized by the terminal apparatus 200 to transmit the device search command and searches for an apparatus that operates as the software AP.

Next, in S1202, in a case where the device search command transmitted from the terminal apparatus 200 is received, the access point 400 transmits the device search response command corresponding to the response with respect to the device search command to the terminal apparatus 200. It should be noted that, as described in the explanation of S702, the access point 400 transmits the device search response command only with respect to the device search command transmitted in the channel used by the access point 400 itself. As a result, the terminal apparatus 200 discovers the access point 400. It should be noted that the channel used for the transmission of the device search response command is determined as the channel used for the communication between the terminal apparatus 200 and the access point 400 hereinafter. That is, the channel used for the communication in the infrastructure mode is determined by the access point 400.

Next, in S1203, the establishment processing for the wireless connection in the related art is executed between the terminal apparatus 200 and the access point 400. Specifically, the processings such as the transmission of the connection request, the authentication of the connection request, and the allocation of the IP address are performed. It should be noted that, similarly as in the P2P mode, with regard to the commands and the parameters transmitted and received in the establishment processing for the wireless connection between the terminal apparatus 200 and the MFP 300, the commands and the parameters stipulated by the Wi-Fi standard may be used, and descriptions thereof will be omitted here.

In S1204 to S1206, the processing similar to S1201 to S1203 is executed between the MFP 300 and the access point 400. It should be noted that, at this time, the access point 400 transmits the device search response command to the MFP 300 by using the channel used for the communication with the terminal apparatus 200. That is, the access point 400 performs the communication with the MFP 300 and the terminal apparatus 200 by using the same channel.

As a result, the MFP 300 and the terminal apparatus 200 are connected with each other via the access point 400, so that it is possible to perform the communication between the MFP 300 and the terminal apparatus 200 via the access point 400.

Cable-Less Setup Mode

According to the present exemplary embodiment, the following configuration is adopted. That is, when a predetermined operation with respect to the operation display unit 305 is accepted, the MFP 300 shifts to a mode in which the setting change of the wireless LAN can be accepted via the wireless connection. Hereinafter, the setting (communication setting) change of the wireless LAN via the wireless connection will be referred to as cable-less setup, and a mode in which the cable-less setup can be accepted will be referred to as a cable-less setup mode. It should be noted that the MFP 300 may perform the shift to the cable-less setup mode by accepting a predetermined command such as beacon, for example. The wireless LAN setting includes, for example, the validation/invalidation setting of the WFD function, negotiation setting, access point setting at a connection destination of the MFP 300, TCP/IP address setting, security setting, and the like. The terminal apparatus 200 can establish an infrastructure connection or P2P connection with the MFP 300 by changing the LAN setting of the MFP 300 by the cable-less setup. Specifically, the terminal apparatus 200 can establish the infrastructure connection with the MFP 300 via the access point by setting the access point to which the terminal apparatus 200 is connected as the connection destination of the MFP 300. In addition, the terminal apparatus 200 can establish the P2P connection with the MFP 300 when the WFD function of the MFP 300 is validated to be connected with the MFP 300 operating as the software AP or the terminal apparatus 200 itself operates as the software AP as a result of the negotiation.

When the mode is shifted to the cable-less setup mode, the MFP 300 validates the predetermined access point in the MFP 300 (in the communication apparatus) which is valid only at the time of the cable-less setup mode. It should be noted that the MFP 300 operating in the cable-less setup mode can also be connected with the terminal apparatus that is not compatible to the WFD function. In addition, the access point that is validated at the time of the cable-less setup mode may adopt a mode in which the connection can be established without authentication and coding processing by using a password, for example. Alternatively, for example, the access point may adopt a mode in which the connection can be established by using fixed connection information previously incorporated in LAN setting application installed into the terminal apparatus that executes the cable-less setup. As a result, the terminal apparatus that executes the cable-less setup can be connected with the MFP 300 operating in the cable-less setup mode without accepting the information of the connection information from the user or obtaining the connection information from the MFP 300. Moreover, a configuration is adopted in which the MFP 300 can only perform the wireless LAN setting change and does not execute the functions of printing, scanning, and the like while the operation is performed in the cable-less setup mode.

Figure 11:
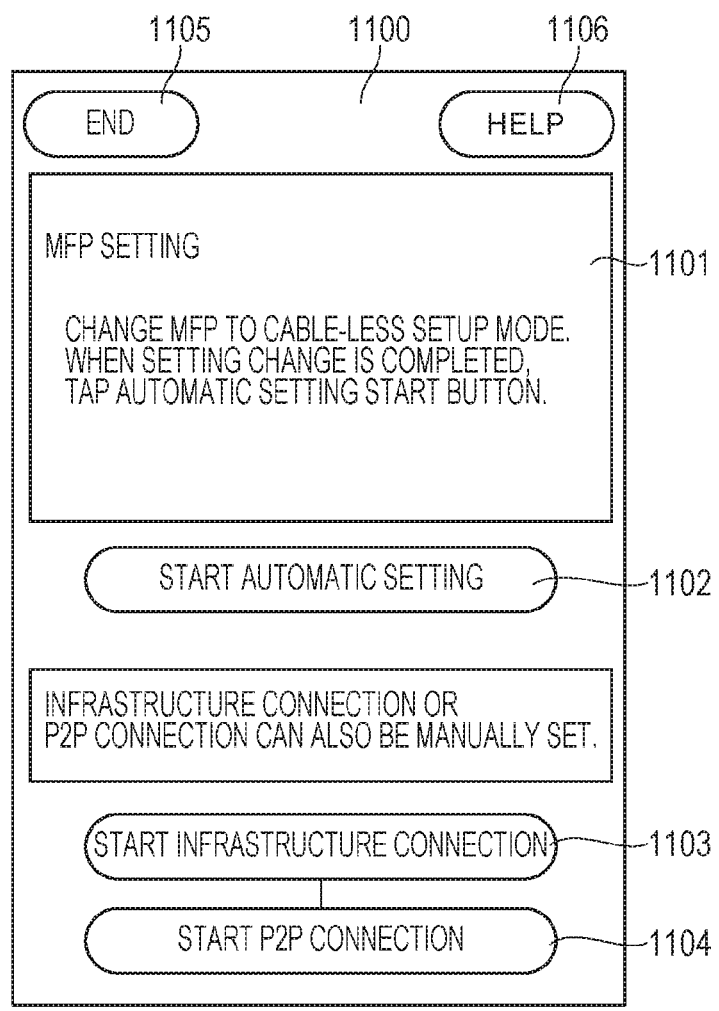
FIG. 11 illustrates an example of a screen for the terminal apparatus to accept an instruction of cable-less setup.

It should be noted that the terminal apparatus 200 needs to install the above-described LAN setting application to execute the setting change of the wireless LAN of the MFP 300 via the wireless connection. Since the LAN setting application realizes semi-automatic processing of the LAN setting via the wireless connection and user friendly UI display, a configuration is established in which even the user having little knowledge about the LAN setting can perform the LAN setting change of the MFP 300. FIG. 11 illustrates an example of a screen displayed by the LAN setting application for the terminal apparatus 200 to accept the instruction or the cable-less setup. A button 1103 is a button for setting the communication mode of the MFP 300 as the infrastructure mode and connecting the MFP 300 with the terminal apparatus 200 via an external access point such as a wireless router (for establishing the infrastructure connection). A button 1104 is a button for validating the WFD function of the MFP 300 and connecting the MFP 300 with the terminal apparatus 200 without the intermediation of the external access point such as the wireless router (for establishing the P2P connection). A button 1102 is a button for connecting the MFP 300 with the terminal apparatus 200 by a connection mode automatically determined by the terminal apparatus 200 from among the infrastructure connection and the P2P connection in accordance with its own connection state. For example, when the input to the button 1102 accepted, in a case where the terminal apparatus 200 itself is connected with the external access point, the terminal apparatus 200 determines that the MFP 300 and the terminal apparatus 200 are connected with each other by way of the infrastructure connection. On the other hand, in a case where the terminal apparatus 200 itself is not connected with the external access point, the terminal apparatus 200 determines that the MFP 300 and the terminal apparatus 200 are connected with each other by way of the P2P connection. It should be noted that a button for accepting an instruction other than the above-described settings may be displayed on the screen for the terminal apparatus 200 to accept the instruction of the cable-less setup. The terminal apparatus 200 transmits the contents of the LAN setting change input from the user via the above-described screen to the MFP 300 by using the previously set communication protocol and the command stipulated for the LAN setting (LAN setting command). The MFP 300 is configured such that the above-described command can be received and interpreted, and in accordance with the received command, the setting application for the cable-less setup installed into the MFP 300 changes the LAN setting of the MFP 300. For example, in a case where the P2P connection between the MFP 300 and the terminal apparatus 200 is established, the LAN setting command to be transmitted to the MFP 300 includes the setting command for shifting the MFP 300 to the P2P mode. The setting command for shifting the MFP 300 to the P2P mode is, for example, the setting command for validating the WFD function of the MFP 300. On the other hand, for example, in a case where the infrastructure connection between the MFP 300 and the terminal apparatus 200 is established, the LAN setting command to be transmitted to the MFP 300 includes the setting command for shifting the MFP 300 to the infrastructure mode.

It should be noted that the terminal apparatus 200 can semi-automatically perform not only the processing for changing the LAN setting of the MFP 300 but also up to the processing for establishing the connection with the MFP 300 by executing the connection establishment processing via the LAN setting application. That is, for example, the user can connect the MFP 300 with the terminal apparatus 200 by simply pressing the button 1102 without the complicated operation such as the input of the connection information for establishing the connection with the MFP 300. As described above, even the user having no technical knowledge about the LAN setting can easily connect the MFP 300 with the terminal apparatus 200 by the cable-less setup, for example.

It should be noted that the MFP 300 can accept an operation for initializing the LAN setting from the user. In a case where the LAN setting is initialized, the MFP 300 sets the WFD function as "invalidated" and the negotiation setting as "absent". As described above, the terminal apparatus that is not compatible to the WFD function 200 is not connected with the MFP 300 in which the negotiation setting is "present". A reason why an initial value of the negotiation setting is "absent" is that a state is established in which the MFP 300 in an initialized state can also be connected with the terminal apparatus that is not compatible to the WFD function 200.

According to the present exemplary embodiment, in a case where the MFP 300 performs the LAN setting change by the acceptance of the operation on the operation display unit 610, a configuration is adopted in which the change of the setting value is performed by setting application for main body setting change. On the other hand, in a case where the LAN setting change is performed by the cable-less setup, the MFP 300 is configured to perform the change of the setting value by setting application for the cable-less setup that is different from the setting application for the main body setting change. However, the setting application used for the change of the setting value does not need to be switched in accordance with an acceptance method for the instruction of the LAN setting change, and a mode may be adopted in which the change of the setting value is performed by the same setting application. In this case, the MFP 300 determines which method is used to accept the instruction of the LAN setting change and executes the processing in accordance with the determination result.

Figure 9:
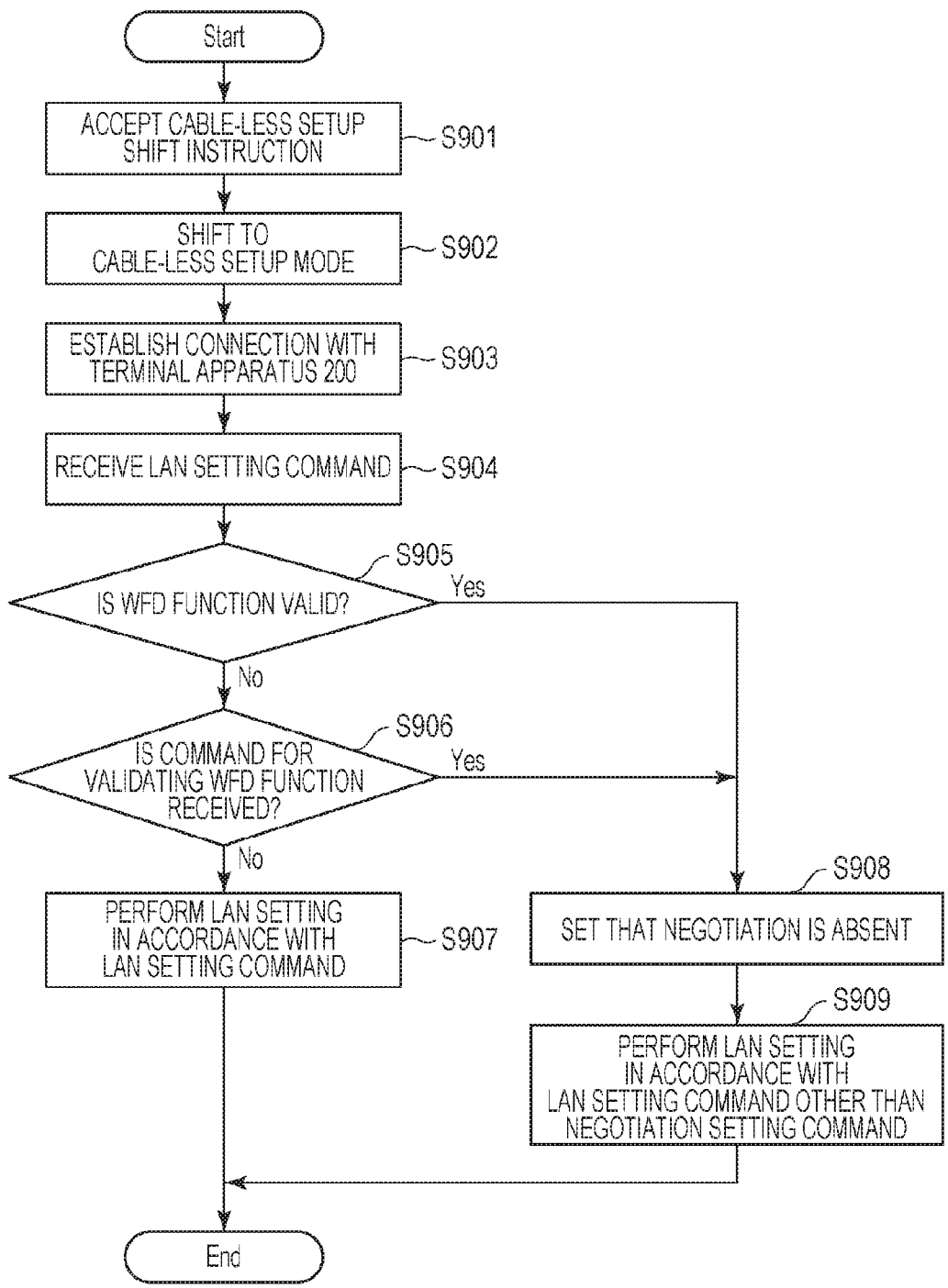
FIG. 9 is a flow chart illustrating processing executed by the MFP according to a first exemplary embodiment.

Processing executed by the MFP 300 to perform the change of the wireless LAN setting by the cable-less setup will be described with reference to a flow chart illustrated in FIG. 9. It should be noted that the processing illustrated in the present flow chart is realized when the program stored in the memory such as the ROM 603 is read out by the CPU 602 to the RAM 604 to be executed, for example.

First, in S901, the CPU 602 accepts the shift instruction to the cable-less setup mode by the operation on the operation display unit 610.

Next, in S902, the CPU 602 shifts the MFP 300 to the cable-less setup mode. Specifically, the CPU 602 validates the predetermined access point in the MFP 300 that is valid only at the time of the cable-less setup mode.

Next, in S903, the CPU 602 accepts the connection request from the terminal apparatus 200 and connects the MFP 300 with the terminal apparatus 200 via the validated access point.

Next, in S904, the CPU 602 receives the LAN setting commands from the terminal apparatus 200 (command reception step). The commands received at this time correspond to the LAN setting change instructions accepted by the terminal apparatus 200 from the user.

Next, in S905, the CPU 602 determines the LAN setting state of the MFP 300 before the shift to the cable-less setup mode. Specifically, the CPU 602 determines whether the setting of the WFD function of the MFP 300 the LAN setting state of the MFP 300 the cable-less setup mode is valid or invalid. In a case where it is determined that the setting of the WFD function is invalid, the CPU 602 proceeds to S906. In a case where it is determined that the setting of the WFD function is valid, the CPU 602 proceeds to S908.

The CPU 602 determines in S906 whether or not the LAN setting commands received in S904 include the setting command for validating the WFD function. In a case where it is determined that the setting command for validating the WFD function of the MFP 300 is not included, the CPU 602 proceeds to S907 and changes the LAN setting of the MFP 300 in accordance with the LAN setting commands received in S904. Specifically, for example, the CPU 602 executes the access point setting at the connection destination of the MFP 300, the TCP/IP address setting, the security setting, or the like. On the other hand, in a case where it is determined that the setting command for validating the WFD function of the MFP 300 included, the CPU 602 proceeds to S908.

In S908, the CPU 602 sets the negotiation setting as "absent" irrespective of the contents of the negotiation setting of the MFP 300 before the shift to the cable-less setup mode. It should be noted that, also in a case where the LAN setting command includes the setting command for changing the negotiation setting (negotiation setting command), the CPU 602 sets the negotiation setting as "absent" irrespective of the contents of the negotiation setting command.

Next, in S909, the LAN setting of the MFP 300 is changed in accordance with commands except for the negotiation setting command among the LAN setting commands received in S904. For example, in a case where the LAN setting commands received in S904 include the setting command for validating the WFD function of the MFP 300, the CPU 602 sets the WFD function of the MFP 300 to be validated. Since the WFD function of the MFP 300 is validated, the MFP 300 can communicate with the terminal apparatus 200 by way of WFD and transmit the device search response to the terminal apparatus 200. Thereafter, as described with reference to FIG. 8, the P2P connection between the terminal apparatus 200 and the MFP 300 is established. It should be noted that, since the negotiation setting of the MFP 300 is set as "absent" at this time, the CPU 602 does not execute the negotiation in the establishment of the connection with the terminal apparatus 200 and operates as the group owner by itself. At this time, for example, before the WFD function of the MFP 300 is validated, the CPU 602 may transmit the connection information of the software AP which is validated when the MFP 300 operates as the group owner to the terminal apparatus 200. Subsequently, after the WFD function of the MFP 300 is validated, when the connection request transmitted from the terminal apparatus 200 by using the connection information is accepted, the CPU 602 may establish the P2P connection between the terminal apparatus 200 and the MFP 300.

In addition, for example, in a case where the LAN setting commands received in S904 include the setting command for shifting the MFP 300 to the infrastructure mode, the CPU 602 establishes the infrastructure connection between the terminal apparatus 200 and the MFP 300. Specifically, for example, first, the CPU 602 transmits an SSID list of the access points to which the MFP 300 can be connected with the terminal apparatus 200. The terminal apparatus 200 that has received the list determines whether or not the access point to which the terminal apparatus 200 itself is currently connected is included in the list. In a case where the access point to which the terminal apparatus 200 itself is currently connected is included in the list, the terminal apparatus 200 transmits the connection information (SSID, password, or the like) of the access point to which the terminal apparatus 200 itself is currently connected with the MFP 300. Subsequently, the CPU 602 connects the access point to which the terminal apparatus 200 is connected with the MFP 300 by using the received connection information, so that the infrastructure connection between the terminal apparatus 200 and the MFP 300 is established. On the other hand, in a case where the access point to which the terminal apparatus 200 itself is currently connected is not included in the list, the terminal apparatus 200 displays this list on the display unit 510 and accepts the selection of the access point used for the infrastructure connection from the user. Then, the terminal apparatus 200 notifies the MFP 300 of the access point selected by the user and establishes the connection with the access point. Thereafter, the CPU 602 connects the notified access point with the MFP 300, so that the infrastructure connection between the terminal apparatus 200 and the MFP 300 is established.

It should be noted that, according to the present exemplary embodiment, the MFP 300 can maintain the P2P connection with the terminal apparatus and the infrastructure connection with the terminal apparatus that is different from the terminal apparatus in the P2P connection at the same tame (in parallel). Hereinafter, an operation in which the infrastructure connection and the P2P connection are maintained at the same time (in parallel) will be referred to as a simultaneous operation.

The communication in the infrastructure mode and the communication in the P2P mode are performed by using a particular frequency band (particular channel). For this reason, in either the communication in the infrastructure mode or the communication in the P2P mode, before the communication is started, first, a channel used for the communication and connection between the respective apparatuses is to be determined. It should be noted that, in a mode in which a communication is performed by allocating a plurality of channels to a single wireless IC chip at the same time, the configurations of the respective apparatuses that perform the communication and the processings executed by the respective apparatuses become complex. Therefore, for example, in a case where the MFP 300 performs the simultaneous operation, a common channel is preferably used for the communications in the respective modes. That is, the MFP 300 preferably uses only one channel in a case where the simultaneous operation is performed. For this reason, according to the present exemplary embodiment, the WLAN unit 616 has only one wireless IC chip configured to realize a communication by using a predetermined channel, and the MFP 300 does not perform the communication by using a plurality of channels at the same time.

At this time, in a case where the negotiation setting is "present", there is a possibility that the MFP 300 itself does not operate as the group owner, and the MFP 300 may establish the P2P connection with the terminal apparatus operating as the group owner. As described above, the apparatus operating as the access point determines the channel used for the communication between the apparatuses. For this reason, in a case where the terminal apparatus operates as the group owner, the terminal apparatus determines the channel used for the communication in the P2P mode. In addition, since the MFP 300 establishes the infrastructure connection with the terminal apparatus via the access point, the access point determines the channel used for the communication in the infrastructure mode. An this manner, in a case where the negotiation setting is "present", there is a possibility that the channels used for the respective communications is determined by an apparatus that is not the MFP 300, and the channels used for the respective communications may be different from each other. Furthermore, as described above, the MFP 300 does not perform the communication by using a plurality of channels at the same time. For this reason, in a case where the negotiation setting is "present", there is a fear that the MFP 300 does not execute the simultaneous operation.

However, according to the present exemplary embodiment, the MFP 300 switches the negotiation setting to "absent" if the WFD function of the MFP 300 is valid when the infrastructure connection is established. As a result, when the P2P connection with another terminal apparatus is established after the infrastructure connection with the terminal apparatus, the MFP 300 itself operates as the group owner and can determine the channel used for the communication in the P2P mode, so that it is possible to execute the simultaneous operation. Specifically, the MFP 300 determines the channel used for the communication in the P2P mode as the same channel as the channel currently used for the communication in the infrastructure mode, so that it is possible to execute the simultaneous operation. In a case where the infrastructure connection is established in a state in which the P2P connection is established with the terminal apparatus operating as the group owner, the MFP 300 switches the negotiation setting to "absent" and invalidates the WFD function. After that, the infrastructure connection is established. Since the negotiation setting is switched to "absent", when the P2P connection is established again, the MFP 300 can suppress a situation where a channel different from the channel used for the infrastructure connection is allocated as the channel used for the P2P connection. In addition, according to the present exemplary embodiment, since the WFD function is invalidated at this time, the MFP 300 transmits a disconnection command to the terminal apparatus 200 and disconnects the P2P connection with the terminal apparatus 200. If the WFD function remains validated, the channel used by the MFP 300 is switched since the infrastructure connection is established, and there is a possibility that the communication between the terminal apparatus 200 and the MFP 300 is not performed irrespective of a state in which the P2P connection is apparently maintained. In this case, since the user that owns the terminal apparatus 200 does not understand a reason why the communication is not performed at first glance, according to the present exemplary embodiment, the MFP 300 invalidates the WFD function. It should be noted that, thereafter, the MFP 300 validates the WFD function again, and when the disconnected P2P connection is established again, it is possible to execute the simultaneous operation.

It should be noted that a mode may be adopted in which the negotiation setting is switched to "absent" when the infrastructure connection is established irrespective of whether the WFD function of the MFP 300 is valid or not. In this case, for example, the CPU 602 determines after the processing in S906 whether or not the LAN setting commands received in S904 include the setting command for shifting the MFP 300 to the infrastructure mode. In a case where it is determined that the setting command is not included, the CPU 602 proceeds to S907. In a case where it is determined that the setting command is included, the CPU 602 proceeds to S908.

In a case where the processing in S907 or S909 is completed, the CPU 602 ends the cable-less setup.

As described above, according to the present exemplary embodiment, in a case where the connection is established with the terminal apparatus 200 by the cable-less setup, the MFP 300 sets the negotiation setting as "absent". That is, in a case where the WFD function is validated the cable-less setup, the MFP 300 sets the negotiation setting as "absent" in conjunction with the validation of the WFD function. Since the negotiation setting is set as "absent" and the WFD function is validated, the MFP 300 itself operates as the access point. Thereafter, the MFP 300 executes the connection processing similar to the processing at the time of the software AP mode such as the transmission of the beacon or the acceptance of the connection request, so that it is also possible to establish the connection with the terminal apparatus 200 that is not compatible to the WFD function. On the other hand, in a case where the MFP 300 validates the WFD function by the cable-less setup, the negotiation setting is set as "absent" irrespective of the contents of the negotiation setting before the cable-less setup. For this reason, in a case where the connection is established with the terminal apparatus 200 by the cable-less setup, even when the negotiation setting of the MFP 300 is set as "present" before the communication setting, the MFP 300 can establish the connection with the terminal apparatus 200 that is not compatible to the WFD function. Therefore, according to the present exemplary embodiment, the user does not need to determine whether or not the terminal apparatus 200 is a model compatible to the WFD function at the time of the cable-less setup. For this reason, when the cable-less setup is used, even the user having little knowledge about the LAN setting can easily establish the P2P connection between the MFP 300 and the terminal apparatus 200, and the usability of the user is improved.

It should be noted that, according to the present exemplary embodiment, when the WFD function is validated by accepting the operation on the operation display unit 610, the MFP 300 does not set the negotiation setting as "absent" in conjunction with the validation of the WFD function. This is because the user who deliberately performs the LAN setting change by the operation on the operation display unit 610 instead of the cable-less setup has knowledge about the LAN setting, and the probability that the user understands influences caused by the negotiation setting is high. For this reason, the MFP 300 accepts the operation for the negotiation setting change (operation to "wireless direct negotiation" of FIG. 4C) to the operation display unit 610 separately in addition to the operation for the WFD function setting change (operation to "wireless direct" of FIG. 4C). In a case where the operation on the operation display unit 610 is accepted, the MFP 300 respectively independently performs the settings in accordance with the accepted operations.

It should be noted that a different mode may be adopted from the mode in which in which the operation for the negotiation setting change (operation to "wireless direct negotiation" of FIG. 4C) is accepted separately in addition to the operation for the WFD function setting change (operation to "wireless direct" of FIG. 4C). For example, a mode may be adopted in which an option in which the WFD function is validated by the negotiation setting "present" and an option in which the WFD function is validated by the negotiation setting "absent" are provided on the screen of FIG. 4C. In this case, the MFP 300 validates the WFD function by the negotiation setting in accordance with the selected option. In any case, when the WFD function is validated by accepting the operation on the operation display unit 610, the MFP 300 may validate the WFD function on the basis of the negotiation setting determined by the user operation.

When the above-described mode is adopted, the user can select the method for connecting the terminal apparatus 200 with the MFP 300 in accordance with a use case. Specifically, in a case where the user desires to easily connect the terminal apparatus 200 with the MFP 300 irrespective of the function of the terminal apparatus 200 or the negotiation setting, the user selects the connection method based on the cable-less setup. On the other hand, in a case where the user desires to connect the terminal apparatus 200 with the MFP 300 on the basis of the negotiation setting, the user selects the connection method based on the setting operation on the operation display unit 601. As described above, the usability of the user can be improved by providing the communication setting method in accordance with the use case.

Second Exemplary Embodiment

According to the present exemplary embodiment, descriptions will be given of a mode in which the LAN setting commands include the setting command related to the negotiation setting, and the processing executed by the MFP 300 is switched in accordance with the setting command related to the negotiation setting. It should be noted that the case where the LAN setting commands include the setting command related to the negotiation setting is a case where the input for setting the negotiation setting as "present" or "absent" is performed by the user with respect to the terminal apparatus 200.

It should be noted that the communication system, the configurations of the respective apparatuses, and the like according to the present exemplary embodiment are similar to those according to the first exemplary embodiment.

Figure 10:
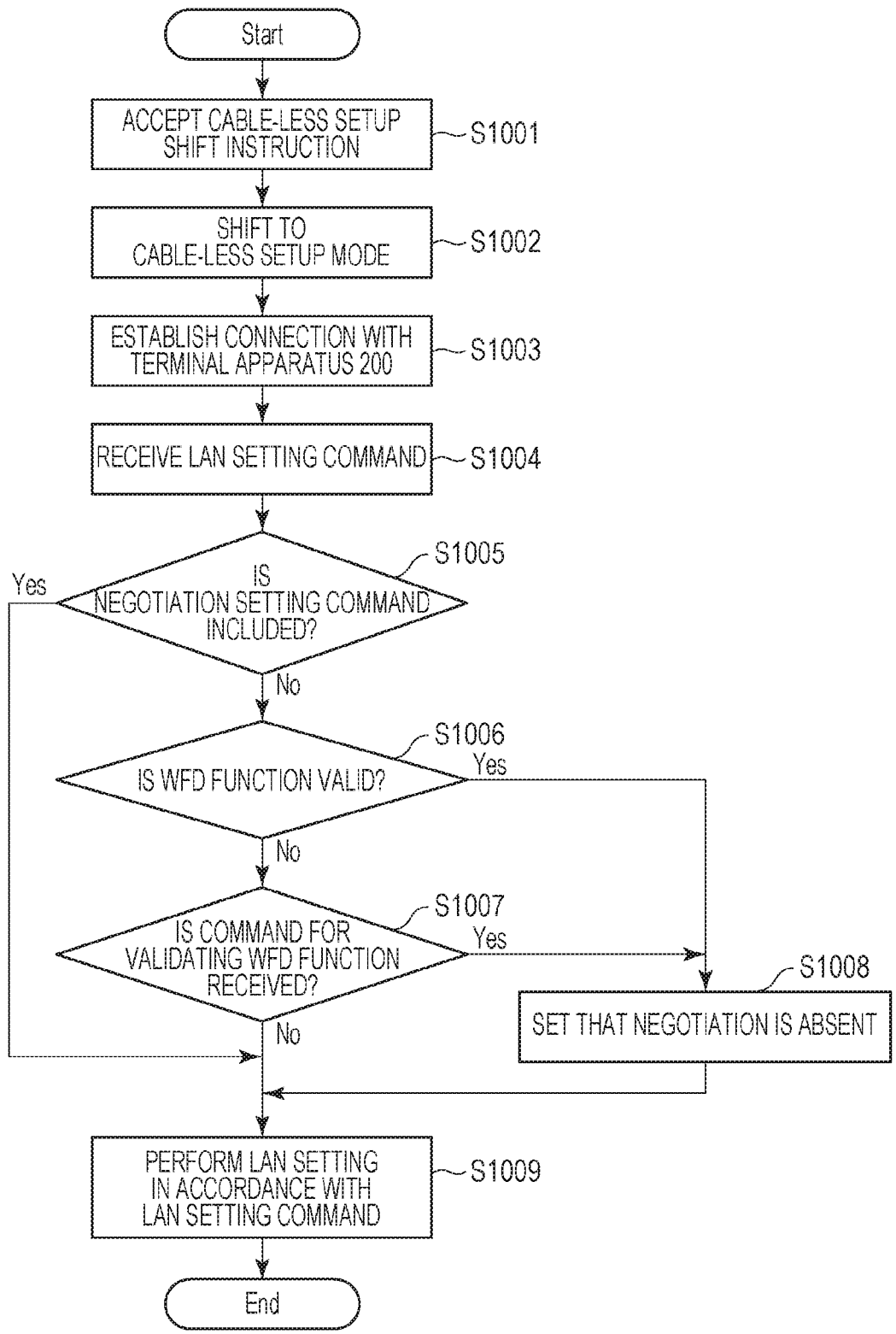
FIG. 10 is a flow chart illustrating the processing executed by the MFP according to a second exemplary embodiment.

The processing executed by the MFP 300 for performing the change of the wireless LAN setting by the cable-less setup will be described with reference to a flow chart illustrated in FIG. 10. It should be noted that the processing illustrated in the present flow chart is realized when the program stored in the memory such as the ROM 603 is read out by the CPU 602 to the RAM 604 to be executed, for example.

It should be noted that, since the processing in S1001 to S1004 is similar to the processing in S901 to S904, descriptions thereof will be omitted.

The CPU 602 determines in S1005 whether or not the LAN setting commands received in S1004 include the setting command for setting the negotiation setting as "present" or "absent" (negotiation setting command). In a case where it is determined that the negotiation setting command is included, the CPU 602 proceeds to S1009 and changes the LAN setting of the MFP 300 in accordance with the LAN setting commands received in S1004. Specifically, for example, in a case where the setting command for setting the negotiation setting as "present" is included, the CPU 602 sets the negotiation setting as "present". On the other hand, in a case where the setting command for setting the negotiation setting as "absent" is included, the CPU 602 sets the negotiation setting as "absent". That is, according to the present exemplary embodiment, the MFP 300 does not necessarily sets the negotiation setting as "absent" in the cable-less setup as in the first exemplary embodiment. According to the present exemplary embodiment, in a case where the negotiation setting command is received, the MFP 300 changes the negotiation setting to the setting value in accordance with this setting command. This is because a probability that the user who can perform the input for setting the negotiation setting as "present" or "absent" to the terminal apparatus 200 is a user having technical knowledge about the LAN setting is considered to be high.

On the other hand, in a case where it is determined in S1005 that the negotiation setting command is not included, the CPU 602 proceeds to S1006. It should be noted that, since the processing in S1006, S1007, and S1008 is similar to the processing in S906, S906, and S908, descriptions thereof will be omitted.

It should be rioted that, also according to the present exemplary embodiment, similarly as in the first exemplary embodiment, when the WFD function is validated by accepting the operation on the operation display unit 610, the CPU 602 does not execute the processing for changing the negotiation setting in conjunction with the validation of the WFD function.

Furthermore, also according to the present exemplary embodiment, similarly as in the first exemplary embodiment, the CPU 602 may determine whether or not the LAN setting commands received in S1004 include the setting command for shifting the MFP 300 to the infrastructure mode after the processing in S1007.

As described above, according to the present exemplary embodiment, the MFP 300 sets the negotiation setting as "absent" in a case where the connection with the terminal apparatus 200 is performed by the cable-less setup without the explicit instruction or the negotiation setting from the user. On the other hand, in a case where the connection with the terminal apparatus 200 is performed by the cable-less setup with the explicit instruction of the negotiation setting from the user, the MFP 300 sets the negotiation setting as the contents in accordance with the instruction.

As a result, the user having little knowledge about the LAN setting and also the user having good knowledge can effectively use the cable-less setup function, and it is possible to improve the usability of the user.

Other Exemplary Embodiments

According to the above-described exemplary embodiments, the MFP 300 uses Wi-Fi to execute the communication in the P2P mode or the communication in the infrastructure mode, but the configuration is not limited to this mode. For example, other communication methods such as Bluetooth® may also be used.

In addition, according to the above-described exemplary embodiments, the MFP 300 uses Wi-Fi for the communication between the apparatuses (communication of the setting command or the like) in the cable-less setup, but the configuration is not limited to this mode. For example, other communication methods such as Bluetooth may also be used.

In addition, according to the above-described exemplary embodiments, whether or not the negotiation setting is switched to "absent" on the basis of the determinations in S905, S906, S1006, and S1007, but the exemplary embodiment is not limited to this mode. A mode may be adopted in which those determinations are not performed. In this case, for example, according to the first exemplary embodiment, the negotiation setting is regularly set as "absent" irrespective of the contents of the setting command at the time of the cable-less setup. In addition, for example, according to the first exemplary embodiment, the negotiation setting is set as "absent" in a case where the setting commands do not include the negotiation setting command at the time of the cable-less setup. In a case where the setting commands include the negotiation setting command, the negotiation setting in accordance with this setting command is executed.

The above-described exemplary embodiments are also realized when the following processing is executed. That is, software (program) for realizing the functions of the above-described exemplary embodiments is supplied to a system or an apparatus via a network or various storage media, and a computer (a CPU, an MPU, or the like) of the system or the apparatus reads out and executes the program. In addition, the program may be executed by a single computer or executed by a plurality of computers in conjunction with each other. Moreover, all of the above-described processings do not necessarily need to be realized by the software, and part or all of the processings may be realized by hardware such as ASIC. Furthermore, the CPU is not limited to a single CPU that performs all the processings, and the processings may be appropriately performed by a plurality of CPUs in cooperation with each other.

According to the exemplary embodiments of the present invention, both the P2P connection that involves the specification processing and the P2P connection that does not involve the specification processing can be executed, and also the P2P connection between the terminal apparatus and the communication apparatus can be easily established.

Embodiment(s) of the present invention can also be realized a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-101792 filed May 20, 2016, which is hereby incorporated by reference herein in its entirety.

What is claimed is:

1. A communication apparatus that is directly connected with a terminal apparatus without an intermediation of an external apparatus that is an apparatus existing outside the terminal apparatus, the communication apparatus comprising:
at least one processor configured to control:
a reception unit configured to receive a setting command for executing a communication setting of the communication apparatus from the terminal apparatus;
an operation acceptance unit configured to accept a setting operation for executing the communication setting of the communication apparatus from a user via an operation unit included in the communication apparatus; and
a setting unit configured to execute the communication setting of the communication apparatus,
wherein, in a case where the reception unit receives the setting command including a predetermined command for operating the communication apparatus in a direct connection state where the communication apparatus is directly connected with the terminal apparatus without an intermediation of the external apparatus, the setting unit executes a first communication setting for operating the communication apparatus in a first direct communication state where the communication apparatus is directly connected with the terminal apparatus without the intermediation of the external apparatus and the communication apparatus does not execute specification processing for specifying whether or not the communication apparatus operates as a specifying apparatus that determines a channel used for a direct connection with the terminal apparatus, and does not execute a second communication processing for operating the communication apparatus in a second direct connection state that the communication apparatus is directly connected with the terminal apparatus without the intermediation of the external apparatus and the communication apparatus executes the specification processing, and
wherein, in a case where the operation acceptance unit accepts the setting operation for operating the communication apparatus in the direct connection state, the setting unit executes one of the communication settings including the first communication setting and the second communication setting.

2. The communication apparatus according to claim 1, wherein the setting unit executes the first communication setting and the communication setting in accordance with the setting command and does not execute the second communication setting in a case where the reception unit receives the setting command and also the communication apparatus operates in the direct connection state.

3. The communication apparatus according to claim 1, wherein the setting unit executes the first communication setting and does not execute the second communication setting in a case where the reception unit receives the setting command including the predetermined command and also the communication apparatus operates in the second direct connection state.

4. The communication apparatus according to claim 1, wherein the setting unit executes the second communication setting in a case where the reception unit receives the setting command including the command for operating the communication apparatus in the second direct connection state, and
wherein the setting unit executes the first communication setting in a case where the reception unit receives the setting command that does not include the command for operating the communication apparatus in the second direct connection state.

5. The communication apparatus according to claim 1, further comprising:
a peer-to-peer (P2P) connection unit configured to directly connect the communication apparatus with the terminal apparatus without the intermediation of the external apparatus based on the reception of the setting command including the predetermined command by the reception unit.

6. The communication apparatus according to claim 1, further comprising:
an infrastructure connection unit configured to connect the communication apparatus with the terminal apparatus via the external apparatus based on the reception of the setting command including a specified command that is different from the predetermined command by the reception unit.

7. The communication apparatus according to claim 1, further comprising:
a validation unit configured to validate a predetermined access point in the communication apparatus,
wherein the reception unit receives the setting command from the terminal apparatus connected with the access point validated by the validation unit.

8. The communication apparatus according to claim 7, wherein a different access point in the communication apparatus from the predetermined access point is validated in a case where the communication apparatus operates as the specifying apparatus.

9. The communication apparatus according to claim 1, wherein the operation acceptance unit can further receive the setting operation for operating the communication apparatus in the second direct communication state and the setting operation for operating the communication apparatus in the first direct communication state from the user via the operation unit, and
wherein the setting unit executes the second communication setting in a case where the operation acceptance unit accepts the setting operation for operating the communication apparatus in the direct connection state and the setting operation for operating the communication apparatus in the second direct communication state, and executes the first communication setting in a case where the operation acceptance unit accepts the setting operation for operating the communication apparatus in the direct connection state and the setting operation for operating the communication apparatus in the first direct communication state.

10. The communication apparatus according to claim 1, wherein the setting unit executes the communication setting for operating the communication apparatus in a state in which the connection with the terminal apparatus can be established by way of Wi-Fi Direct (registered trademark) without the intermediation of the external apparatus.

11. The communication apparatus according to claim 1, wherein the reception unit can receive the setting command from the terminal apparatus by way of Wi-Fi (registered trademark) or Bluetooth (registered trademark).

12. The communication apparatus according to claim 1, further comprising:

a printing unit configured to print an image on a recording medium.

13. A control method for a communication apparatus that is directly connected with a terminal apparatus without an intermediation of an external apparatus that is an apparatus existing outside the terminal apparatus, the control method comprising:

receiving a setting command for executing a communication setting of the communication apparatus from the terminal apparatus;

accepting a setting operation for executing the communication setting of the communication apparatus from a user via an operation unit included in the communication apparatus; and setting the communication setting of the communication apparatus, wherein, in a case where the setting command including a predetermined command for operating the communication apparatus in a direct connection state where the communication apparatus is directly connected with the terminal apparatus without an intermediation of the external apparatus is received, a first communication setting for operating the communication apparatus in a first direct connection state where the communication apparatus is directly connected with the terminal apparatus without the intermediation of the external apparatus and the communication apparatus does not execute specification processing for specifying whether or not the communication apparatus operates as a specifying apparatus that determines a channel used for a direct connection with the terminal apparatus, and a second communication setting for operating the communication apparatus in a second direct connection state that the communication apparatus is directly connected with the terminal apparatus without the intermediation of the external apparatus is not executed and the communication apparatus executes the specification processing, and wherein, in a case where the setting operation for operating the communication apparatus in the direct connection state is accepted, one of the communication settings including the first communication setting and the second communication setting is executed.

14. A non-transitory computer readable storage medium storing a program for causing a communication apparatus that is directly connected with a terminal apparatus without an intermediation of an external apparatus that is an apparatus existing outside the terminal apparatus to perform a method comprising:

receiving a setting command for executing a communication setting of the communication apparatus from the terminal apparatus;

accepting a setting operation for executing the communication setting of the communication apparatus from a user via an operation unit included in the communication apparatus; and setting the communication setting of the communication apparatus, wherein, in a case where the setting command including a predetermined command for operating the communication apparatus in a direct connection state where the communication apparatus is directly connected with the terminal apparatus without an intermediation of the external apparatus is received, a first communication setting for operating the communication apparatus in a first direct connection state where the communication apparatus is directly connected with the terminal apparatus without the intermediation of the external apparatus and the communication apparatus does not execute specification processing for specifying whether or not the communication apparatus operates as a specifying apparatus that determines a channel used for a direct connection with the terminal apparatus, and a second communication setting for operating the communication apparatus in a second direct connection state that the communication apparatus is directly connected with the terminal apparatus without the intermediation of the external apparatus is not executed and the communication apparatus executes the specification processing, and wherein, in a case where the setting operation for operating the communication apparatus in the direct connection state, one of the communication settings including the first communication setting and the second communication setting is executed.

\* \* \* \* \*